(12) United States Patent
Ko et al.

(10) Patent No.: US 11,979,324 B2
(45) Date of Patent: May 7, 2024

(54) METHOD AND APPARATUS FOR PERFORMING SL COMMUNICATION ON BASIS OF STATE OF USER EQUIPMENT IN NR V2X

(71) Applicant: LG ELECTRONICS INC., Seoul (KR)

(72) Inventors: Woosuk Ko, Seoul (KR); Youngdae Lee, Seoul (KR); Laeyoung Kim, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 399 days.

(21) Appl. No.: 17/310,169

(22) PCT Filed: Feb. 17, 2020

(86) PCT No.: PCT/KR2020/002239
§ 371 (c)(1),
(2) Date: Jul. 22, 2021

(87) PCT Pub. No.: WO2020/167094
PCT Pub. Date: Aug. 20, 2020

(65) Prior Publication Data
US 2022/0131803 A1 Apr. 28, 2022

(30) Foreign Application Priority Data
Feb. 15, 2019 (KR) .................. 10-2019-0017628

(51) Int. Cl.
*H04L 47/11* (2022.01)
*H04L 47/12* (2022.01)
*H04L 47/24* (2022.01)

(52) U.S. Cl.
CPC .............. *H04L 47/11* (2013.01); *H04L 47/12* (2013.01); *H04L 47/24* (2013.01)

(58) Field of Classification Search
CPC ......... H04L 47/11; H04L 47/12; H04L 47/24; H04W 72/02; H04W 72/12; H04W 74/08;
(Continued)

(56) References Cited

U.S. PATENT DOCUMENTS

| | | | |
|---|---|---|---|
| 2018/0279094 A1* | 9/2018 | Blasco Serrano | H04W 72/04 |
| 2021/0329596 A1* | 10/2021 | Freda | H04W 72/541 |
| 2021/0400448 A1* | 12/2021 | Adjakple | H04W 4/40 |

FOREIGN PATENT DOCUMENTS

KR 1020090077927 7/2009

OTHER PUBLICATIONS

PCT International Application No. PCT/KR2020/002239, International Search Report dated May 21, 2020, 4 pages.
(Continued)

*Primary Examiner* — Sharmin Chowdhury
(74) *Attorney, Agent, or Firm* — LEE, HONG, DEGERMAN, KANG & WAIMEY

(57) ABSTRACT

A method for performing wireless communication by a first device and an apparatus supporting same are provided. The method may comprise the steps of: measuring a congestion ratio for a resource associated with sidelink (SL); determining the priority of a service on the basis of the quality of service (QoS) of the service and a state of the first device; and determining a transmission parameter on the basis of the congestion ratio and the priority of the service.

17 Claims, 24 Drawing Sheets

(58) Field of Classification Search
CPC ..... H04W 84/20; H04W 92/18; H04W 72/52; H04W 72/53; H04W 72/569; H04W 74/0808
See application file for complete search history.

(56) References Cited

OTHER PUBLICATIONS

InterDigital, Inc., "Discussion on Range Requirement and CBR/CR in NR V2X," 3GPP TSG RAN WG1 Ad-hoc Meeting 1901, R1-1900770, Jan. 2019, 5 pages.
Fraunhofer IIS et al., "QoS Managerment for NR V2X," 3GPP TSG RAN WG1 AH 1901, R1-1900358, Jan. 2019, 5 pages.
ZTE et al., "Discussion on QoS management," 3GPP TSG RAN WG1 Ad-Hoc Meeting 1901, R1-1900779, Jan. 2019, 3 pages.
Huawei et al., "QoS managerment for NR V2X," 3GPP TSG RAN WG1 Ad-Hoc Meeting 1901, R1-1900029, Jan. 2019, 4 pages.

* cited by examiner (a)

(b)

(a)

(b)

METHOD AND APPARATUS FOR PERFORMING SL COMMUNICATION ON BASIS OF STATE OF USER EQUIPMENT IN NR V2X

CROSS-REFERENCE TO RELATED APPLICATIONS

This application is the National Stage filing under 35 U.S.C. 371 of International Application No. PCT/KR2020/002239, filed on Feb. 17, 2020, which claims the benefit of earlier filing date and right of priority to Korean Patent Application No. 10-2019-0017628, filed on Feb. 15, 2019, the contents of which are all incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, if a UE is outside a coverage of a network, the network cannot be directly connected to the UE. Accordingly, the network may not be able to configure operation(s) of the UE adaptively based on conditions and situations. In particular, if authorities and situations of UE(s) are variable, the network may not be able to pre-configure the UE(s) to perform a specific operation through pre-configuration.

Technical Solutions

In one embodiment, provided is a method for performing wireless communication by a first device. The method may comprise: measuring a congestion level for at least one resource related to a sidelink (SL); determining a priority of a service based on quality of service (QoS) of the service and a state of the first device; and determining a transmission parameter based on the congestion level and the priority of the service.

In one embodiment, provided is a first device configured to perform wireless communication. The first device may comprise: one or more memories storing instructions; one or more transceivers; and one or more processors connected to the one or more memories and the one or more transceivers. The one or more processors may execute the instructions to: measure a congestion level for at least one resource related to a sidelink (SL); determine a priority of a service based on quality of service (QoS) of the service and a state of the first device; and determine a transmission parameter based on the congestion level and the priority of the service.

Effects of the Disclosure

The user equipment (UE) may efficiently perform SL communication.

DESCRIPTION OF EXEMPLARY EMBODIMENTS

Figure 1:
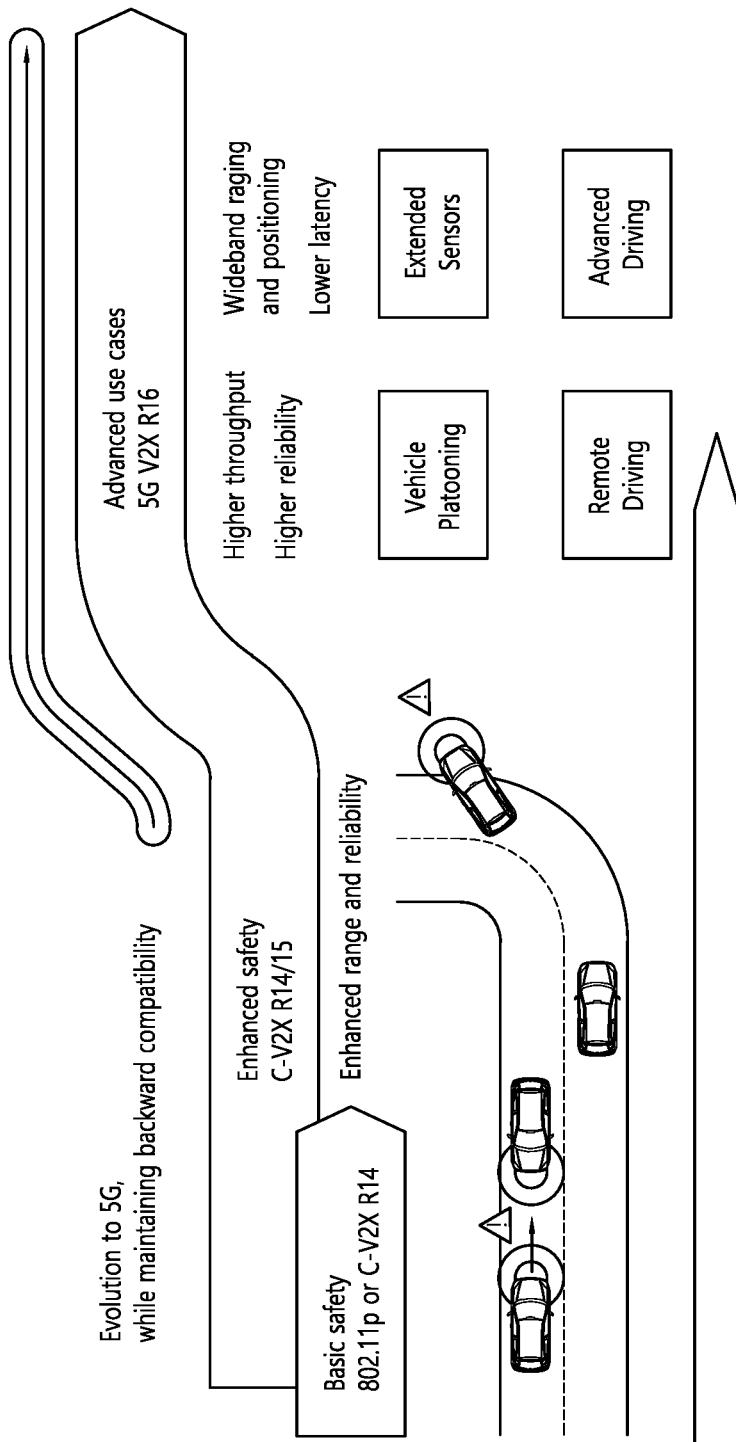
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
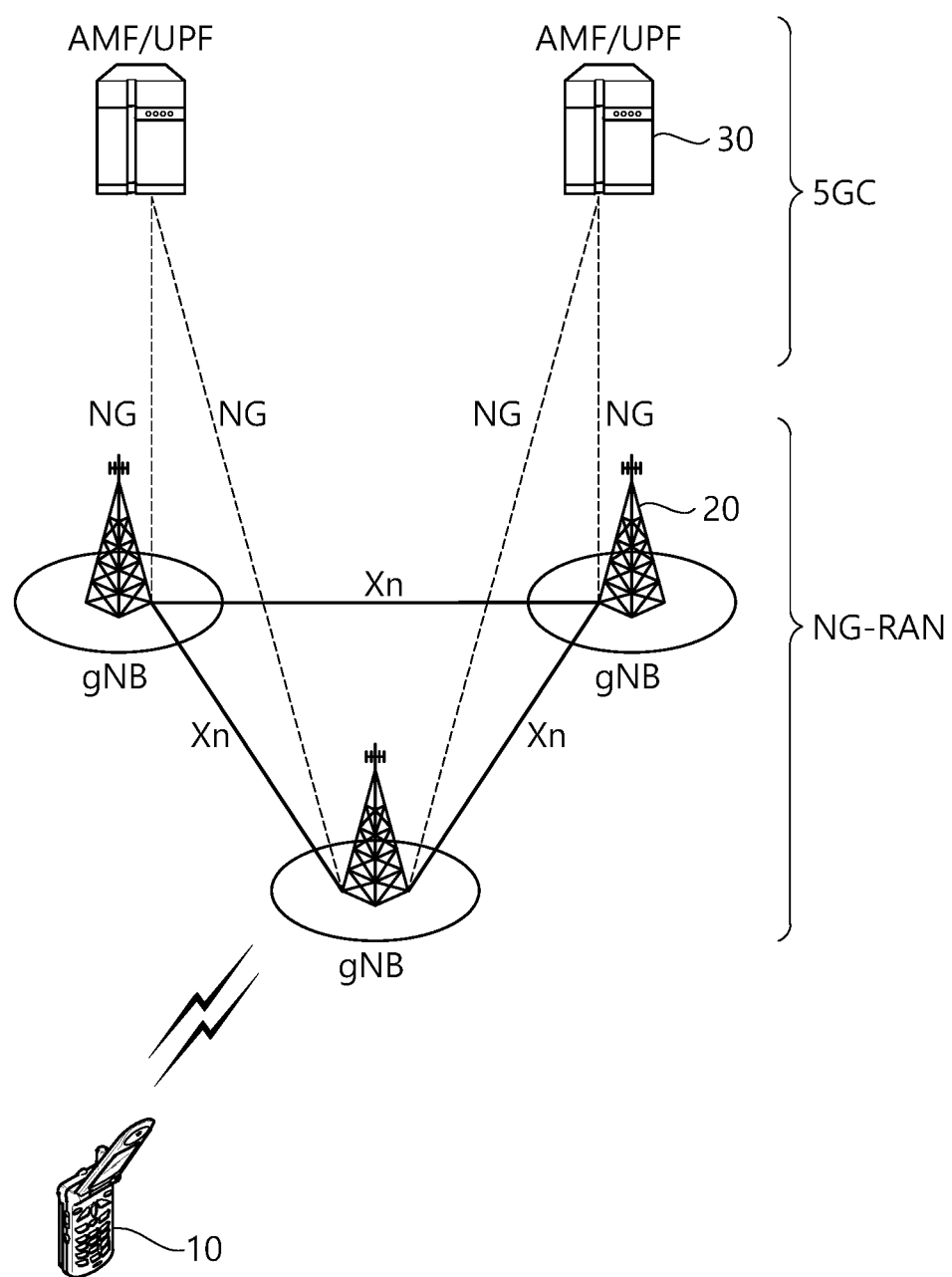
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
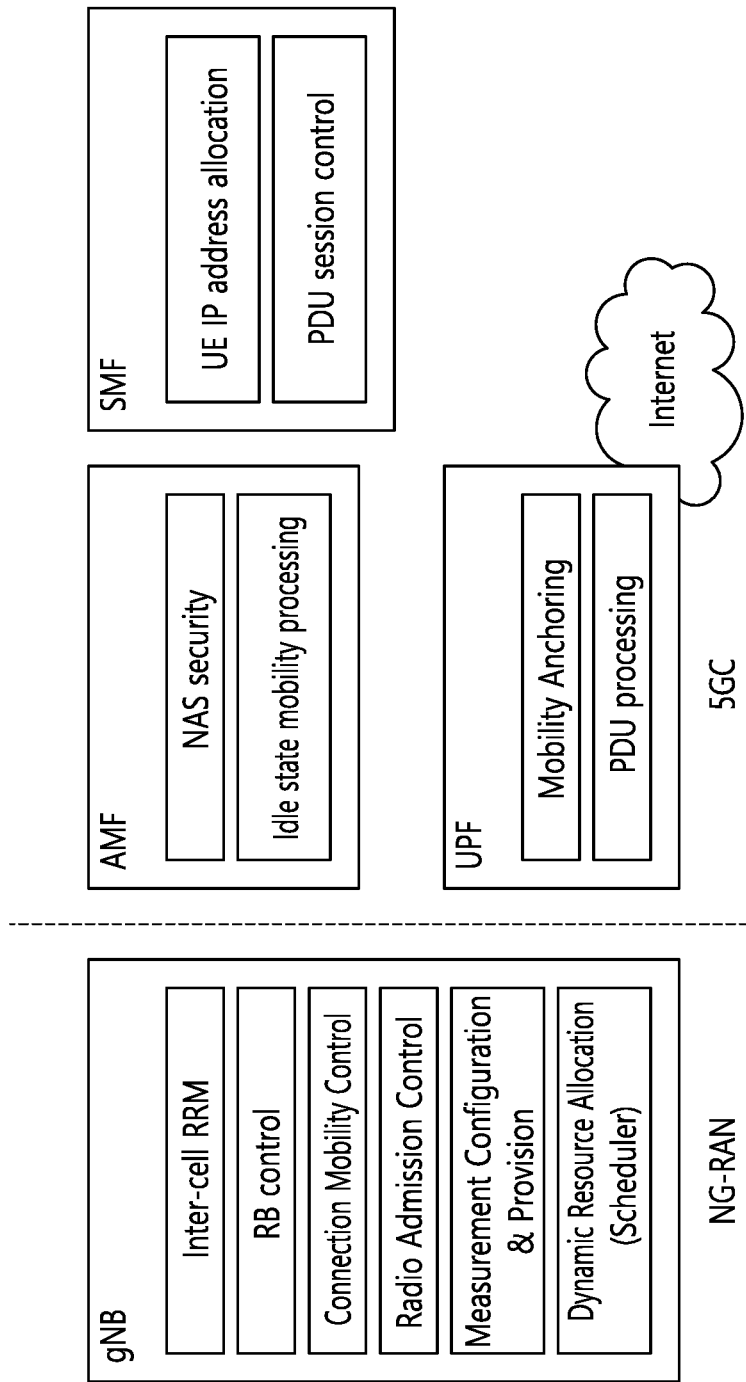
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
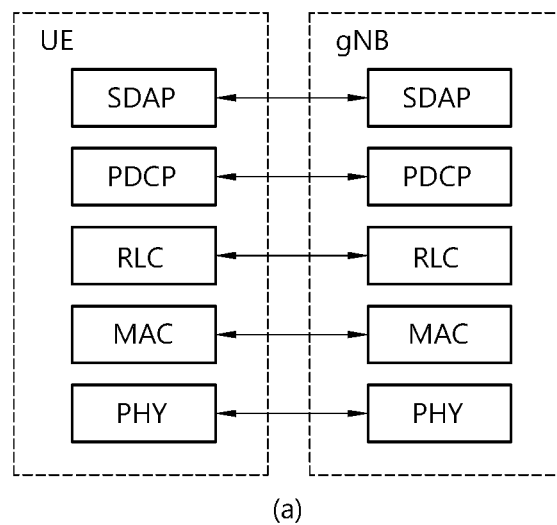
FIG. 4 shows a radio protocol architecture, based on an embodiment of the present disclosure.
Figure 4:
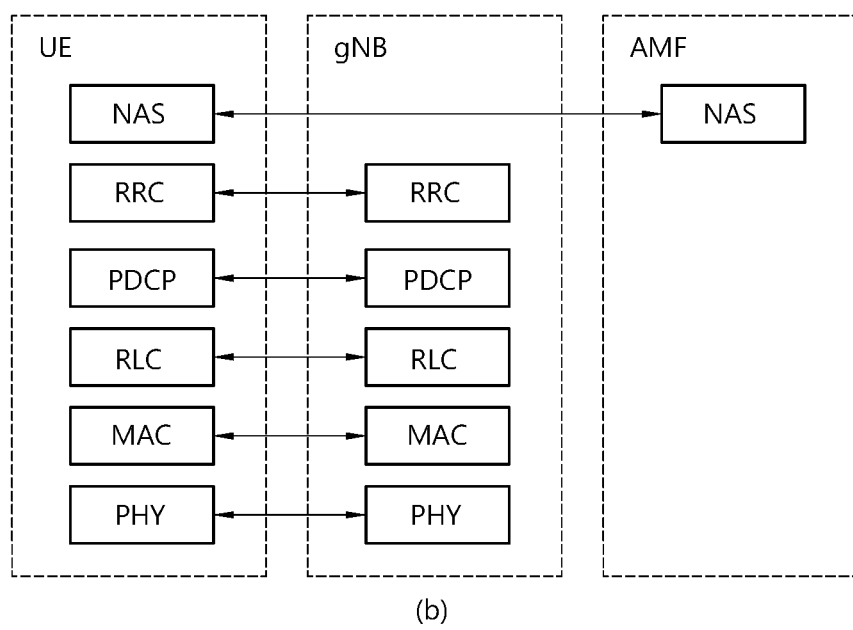

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
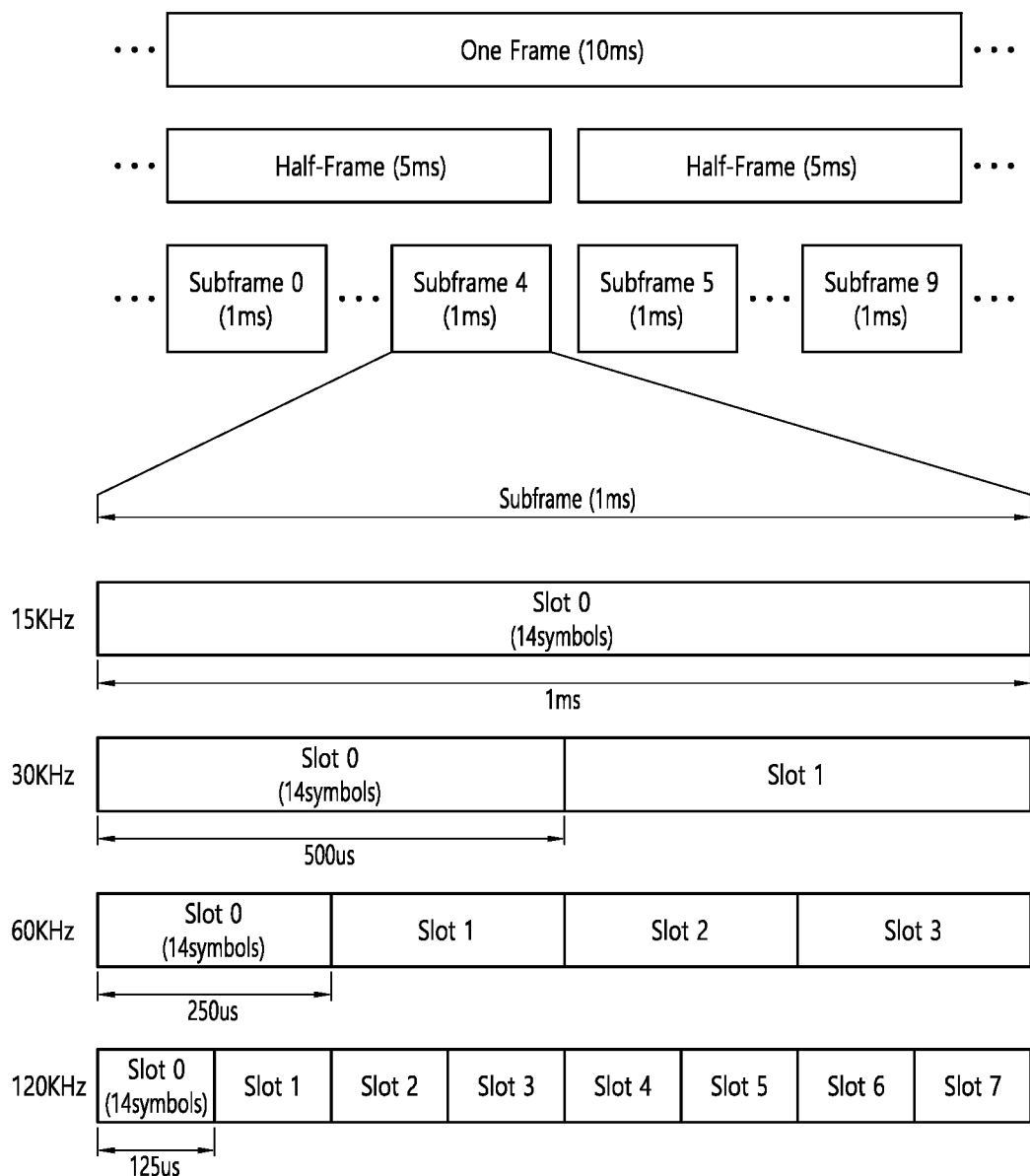
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15 * 2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHZ-6000 MHZ | 15, 30, 60 kHz |
| FR2 | 24250 MHZ-52600 MHZ | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHZ-7125 MHZ | 15, 30, 60 kHz |
| FR2 | 24250 MHZ-52600 MHZ | 60, 120, 240 kHz |

Figure 6:
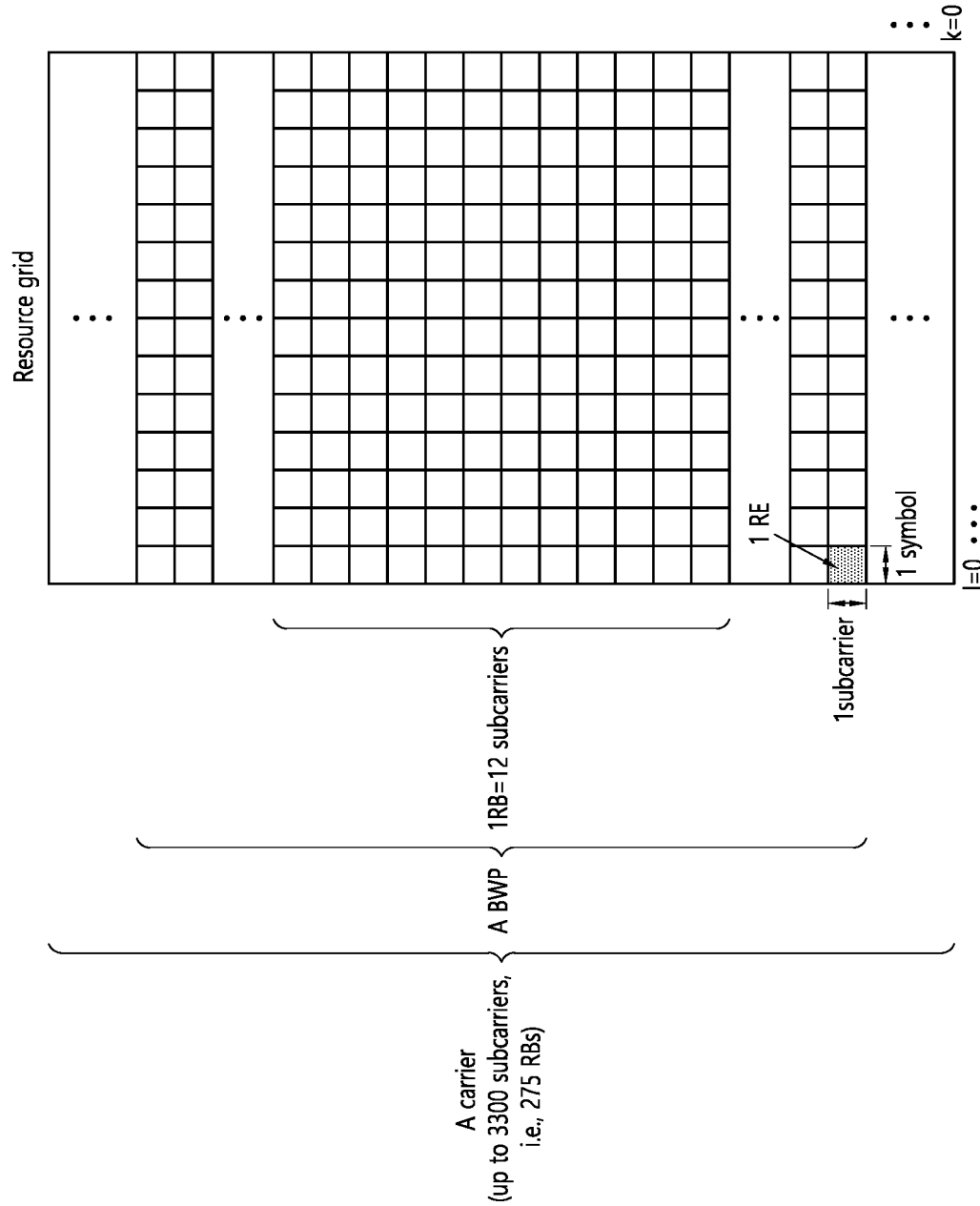
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the B S/network configures the BWP to the UE and the B S/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
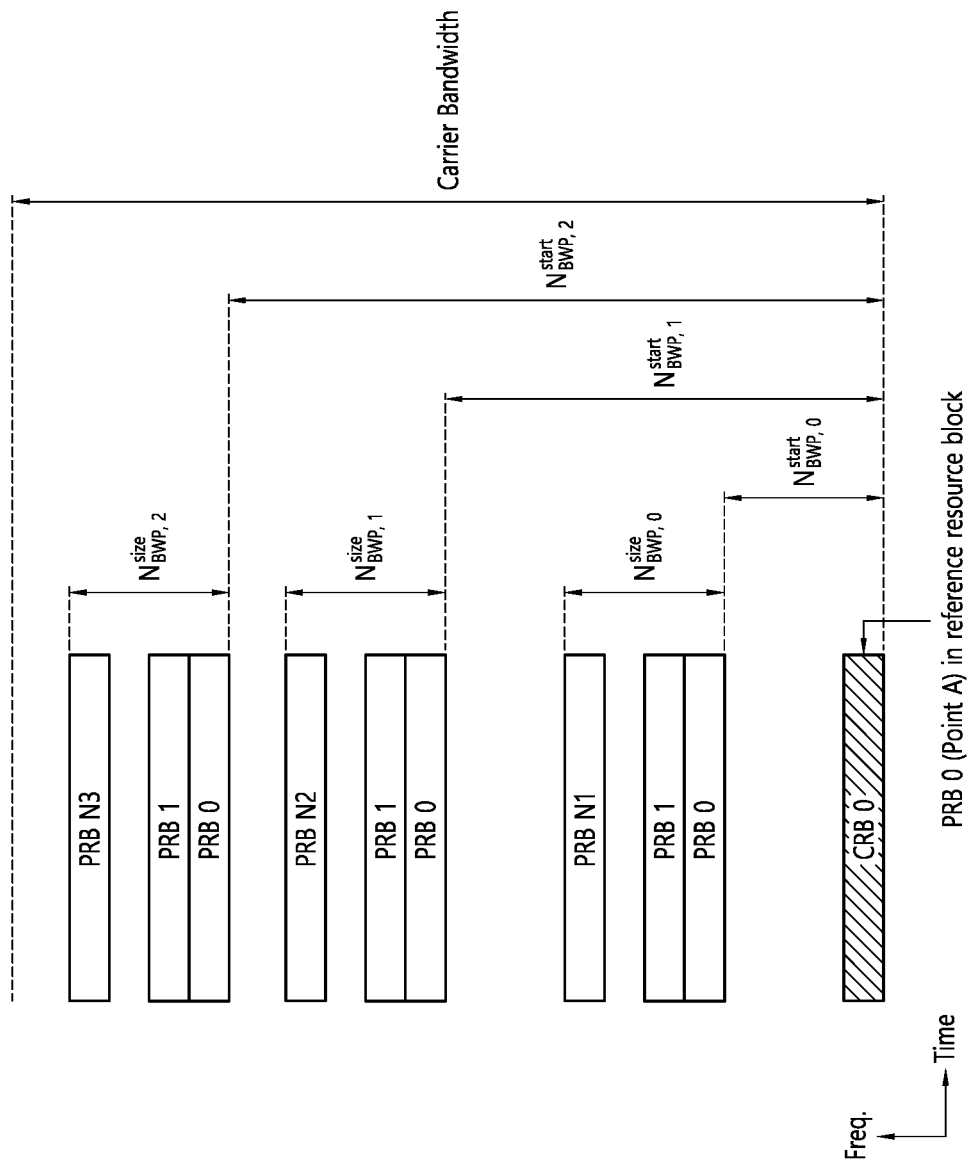
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8:
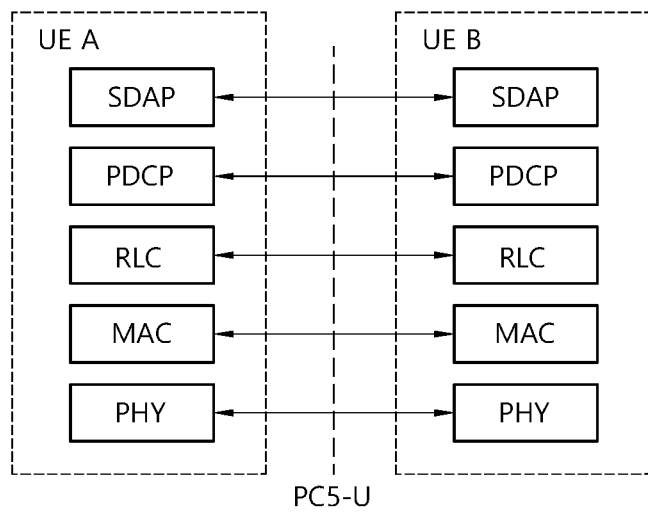
FIG. 8 shows a radio protocol architecture for a SL communication, based on an embodiment of the present disclosure.
Figure 8:
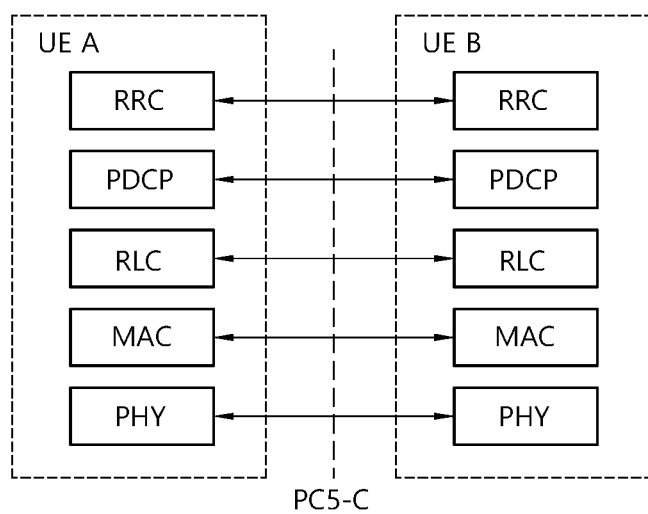

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
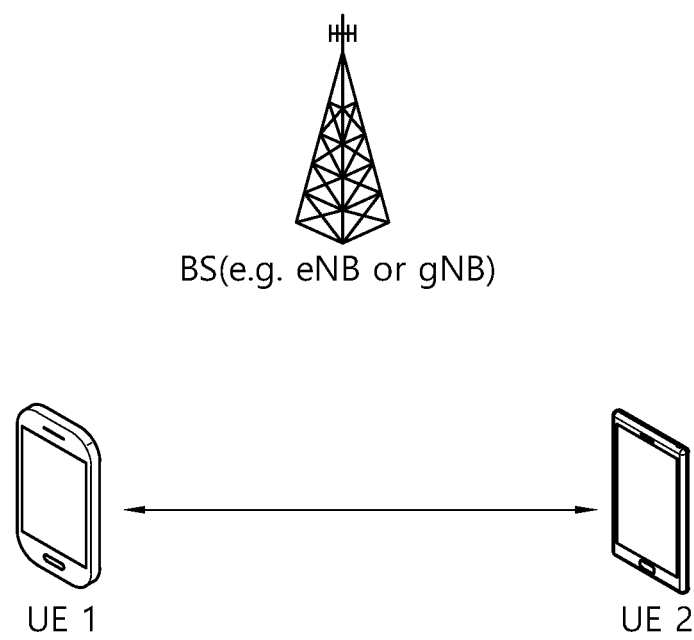
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
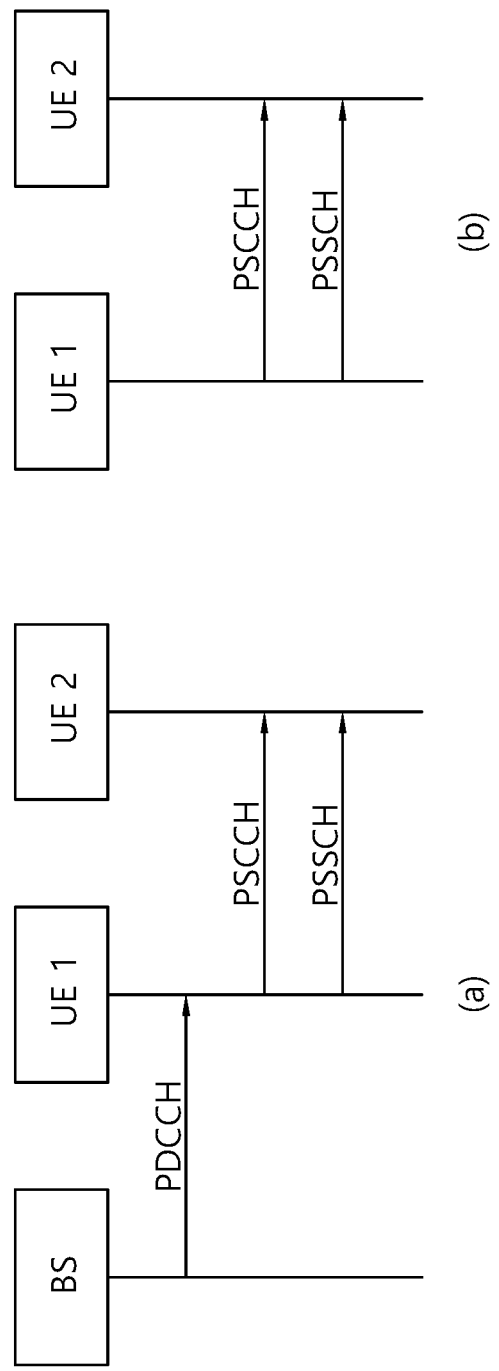
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

For example, the UE may assist the SL resource selection for another UE. For example, in the NR resource allocation mode 2, the UE may be provided/allocated with a configured grant for SL transmission. For example, in the NR resource allocation mode 2, the UE may schedule SL transmission of another UE. For example, in the NR resource allocation mode 2, the UE may reserve an SL resource for blind retransmission.

For example, in the NR resource allocation mode 2, the UE 1 may use the SCI to indicate a priority of SL transmission to the UE 2. For example, the UE 2 may decode the SCI, and the UE 2 may perform sensing and/or resource (re)selection on the basis of the priority. For example, the resource (re)selection procedure may include a step in which the UE 2 identifies a candidate resource in a resource selection window and a step in which the UE 2 selects a resource for (re)transmission among the identified candidate resources. For example, the resource selection window may be a time interval for selecting a resource for SL transmission by the UE. For example, after the UE 2 triggers resource (re)selection, the resource selection window may start at T1≥0, and the resource selection window may be restricted by a remaining packet delay budget of the UE 2. For example, in the step in which the UE 2 identifies the candidate resource in the resource selection window, if a specific resource is indicated by the SCI received by the UE 2 from the UE 1 and if an L1 SL RSRP threshold for the specific resource exceeds an SL RSRP threshold, the UE 2 may not determine the specific resource as the candidate resource. For example, the SL RSRP threshold may be determined based on a priority of SL transmission indicated by the SCI received by the UE 2 from the UE 1 and a priority of SL transmission on a resource selected by the UE 2.

For example, the L1 SL RSRP may be measured based on an SL demodulation reference signal (DMRS). For example, one or more PSSCH DMRS patterns may be configured or pre-configured in a time domain for each resource pool. For example, a PDSCH DMRS configuration type 1 and/or type 2 may be identical or similar to a frequency domain pattern of the PSSCH DMRS. For example, a correct DMRS pattern may be indicated by the SCI. For example, in the NR resource allocation mode 2, the transmitting UE may select a specific DMRS pattern from among configured or pre-configured DMRS patterns for the resource pool.

For example, in the NR resource allocation mode 2, the transmitting UE may perform initial transmission of a transport block (TB) without reservation, based on the sensing and resource (re)selection procedure. For example, the transmitting UE may use an SCI related to a first/initial RB to reserve an SL resource for initial transmission of a second TB, based on the sensing and resource (re)selection procedure.

For example, in the NR resource allocation mode 2, the UE may reserve a resource for feedback-based PSSCH retransmission, through signaling related to previous transmission of the same TB. For example, the maximum number of SL resources reserved by one transmission including current transmission may be 2, 3, or 4. For example, the maximum number of SL resources may be identical irrespective of whether HARQ feedback is enabled. For example, the maximum number of HARQ (re)transmissions for one TB may be restricted by a configuration or a pre-configuration. For example, the maximum number of HARQ (re)transmissions may be up to 32. For example, in the absence of the configuration or the pre-configuration, the maximum number of HARQ (re)transmissions may not be designated. For example, the configuration or the pre-configuration may be for the transmitting UE. For example, in the NR resource allocation mode 2, HARQ feedback for releasing a resource not used by the UE may be supported.

For example, in the NR resource allocation mode 2, the UE may use the SCI to indicate to another UE one or more sub-channels and/or slots used by the UE. For example, the UE may use the SCI to indicate to another UE one or more sub-channels and/or slots reserved by the UE for PSSCH (re)transmission. For example, a minimum allocation unit of an SL resource may be a slot. For example, a size of a sub-channel may be configured for the UE or may be pre-configured.

Figure 11:
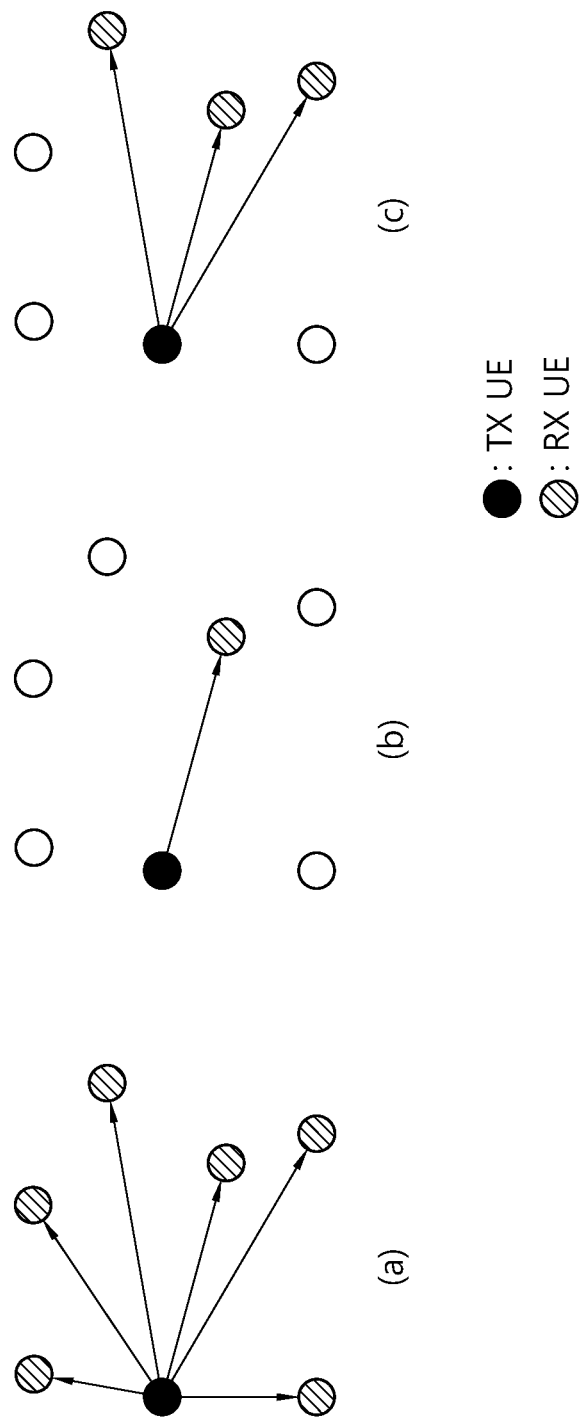
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present specification, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present specification, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 12:
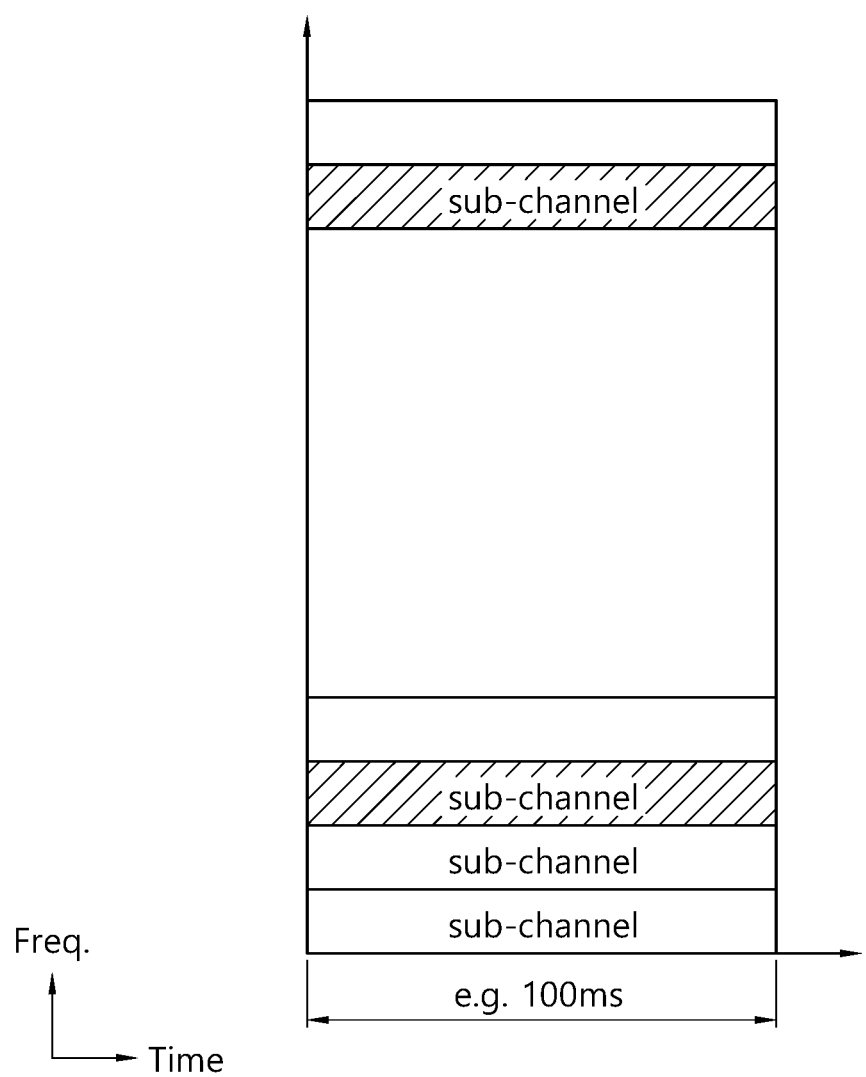
FIG. 12 shows a resource unit for CBR measurement, based on an embodiment of the present disclosure.

FIG. 12 shows a resource unit for CBR measurement, based on an embodiment of the present disclosure. The embodiment of FIG. 12 may be combined with various embodiments of the present disclosure.

Referring to FIG. 12, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 12, if it is assumed that a hatched sub-channel is a sub-channel having a value greater than or equal to a pre-configured threshold, the CBR may denote a ratio of the hatched sub-channels for a period of 100 ms. Additionally, the CBR may be reported to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

Meanwhile, in SL communication or V2X communication, a network may determine operation(s) of UE(s) connected to the network, and the network may transmit configuration parameter(s) related to the operation(s) of the UE(s) to the UE(s) connected to the network. For example, the network may be a base station, a core network, and/or a V2X server, etc. If a UE possesses a specific authority, or if a specific UE or group of UEs is required to perform a specific operation in communication environment, the network may change the configuration parameter(s) related to the operation(s) of the UE(s) to satisfy relevant requirements, and the network may transmit the configuration parameter(s) to the UE(s). However, if a UE is outside a coverage of the network, that is, in case of an out-of-coverage UE, the network cannot be directly connected to the UE. Accordingly, the network may not be able to configure operation(s) of the UE adaptively based on conditions and situations. In particular, if authorities and situations of UE(s) are variable, the network may not be able to pre-configure the UE(s) to perform a specific operation through pre-configuration.

The present disclosure relates to a method in which a network transmits configuration(s) related to UE operation(s) to UE(s) in advance, and the UE(s) operates by selecting configuration parameter(s) based on its environment and granted authority if the UE(s) is in an out-coverage situation, and an apparatus supporting the same. In addition, the present disclosure may include, in SL-based communication that performs direct communication between UEs, in case of groupcast communication such as platooning, a method for a platooning group leader to efficiently use a channel by controlling/managing operation(s) of platooning group members in a group and an apparatus supporting the same.

For example, in an environment in which density of UEs is high, probability that UEs simultaneously access a channel to transmit message(s) may increase. Accordingly, UEs may fail to transmit message(s), and UEs may attempt to retransmit the message(s). This can lead to a vicious cycle that aggravates the channel congestion situation. In this case, a priority of message(s), transmitted by a group leader which has to control overall operation(s) of groupcast and maintain/manage a group, is higher than a priority of message(s) transmitted by other group member(s) in order to maintain minimize groupcast operation(s).

For example, as a method of selectively determining a priority of message(s) transmitted by a UE, a method for selecting a transmission priority of message(s) transmitted by a specific UE, such as a group leader, by considering both a priority related to the corresponding service given by an application layer of the specific UE and an identity of the specific UE possessing authority, will be described.

Based on an embodiment of the present disclosure, the network may transmit (in advance) configuration parameters of various levels related to operation(s) of UE(s), to the UE(s) connected with the network. For example, the network may transmit SL-related configuration parameters to UE(s) connected with the network. For example, the configuration parameters may include at least one of parameter(s) related to frequency and frame structure, parameter(s) related to resource pool(s), parameter(s) related to resource selection, parameter(s) related to resource reselection, parameter(s) related to synchronization channel(s), and/or parameter(s) related to congestion control. For example, parameter(s) related to congestion control may include parameter(s) related to a channel busy ratio (CBR) and/or parameter(s) related to a channel occupancy ratio (CR).

In addition, if a UE that has received the configuration parameter(s) satisfies a specific situation in out-coverage or a specific authority is given to the UE, the UE may select and use a specific configuration parameter, autonomously, based on a rule (pre-)configured for the UE. For example, a group member UE, which has been delegated a leader authority from a group leader UE, may select at least one new configuration parameter necessary to operate as a group leader UE autonomously, from among the configuration parameters, regardless of whether the group member UE is connected to a network or not. For example, the group leader UE may transmit an indicator or information to a specific group member UE to delegate group leader authority. For example, in case that a plurality of vehicles form a platooning group and drive, if an existing group header vehicle should be replaced with one of group member vehicles due to fuel consumption of the group header vehicle, etc., the newly replaced vehicle may have to perform the newly acquired authority and role as the new group header vehicle. In this case, the newly replaced group header vehicle may select and use a new configuration parameter necessary for operation as a group header autonomously, regardless of whether or not the newly replaced group header vehicle is connected to a network.

Figure 13:
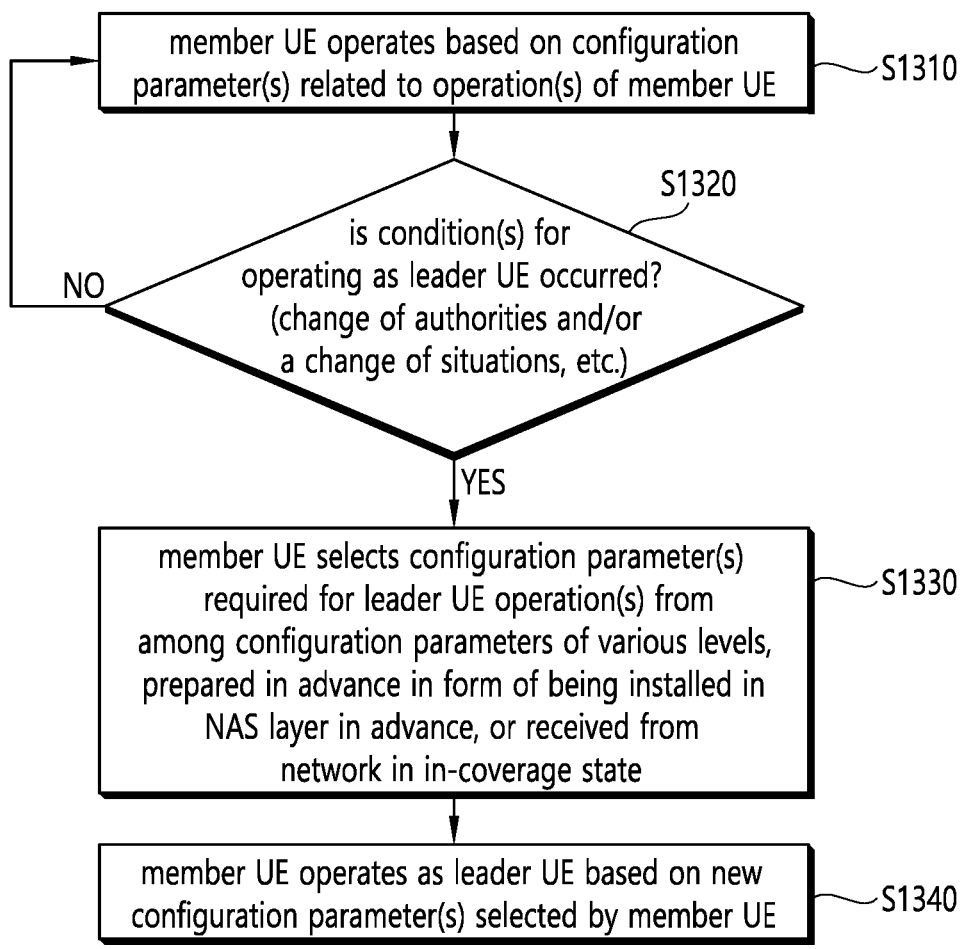
FIG. 13 shows a method in which a member UE operates as a leader UE autonomously, based on an embodiment of the present disclosure.

FIG. 13 shows a method in which a member UE operates as a leader UE autonomously, based on an embodiment of the present disclosure. The embodiment of FIG. 13 may be combined with various embodiments of the present disclosure.

Referring to FIG. 13, in step S1310, a member UE may operate based on configuration parameter(s) related to operation(s) of the member UE. For example, a network may configure the configuration parameter(s) in advance to UE(s) within a coverage of the network. For example, the network may transmit information related to the configuration parameter(s) to UE(s) within a coverage of the network.

In step S1320, the member UE may determine whether or not condition(s) for operating as a leader UE occurs. For example, if condition(s) such as a change of authorities and/or a change of situations occurs, the member UE may determine that condition(s) for operating as the leader UE occurs. For example, if the above condition(s) does not occur, the member UE may perform the operation of step S1310. For example, if the above condition(s) occurs, the member UE may perform the operation of step S1330.

In step S1330, the member UE may select or determine configuration parameter(s) required for UE operation(s) in a changed state. For example, if the member UE is located within the coverage of the network, the member UE may receive configuration parameter(s) required for UE operation(s) in a changed state from the network. For example, if the member UE is located outside the coverage of the network, the member UE may select configuration parameter(s) required for UE operation(s) in a changed state, from among configuration parameters of various levels prepared in advance in a form of being installed in a NAS layer in advance.

In step S1340, the member UE may operate as the leader UE based on the new configuration parameter(s) selected by the member UE.

Figure 14:
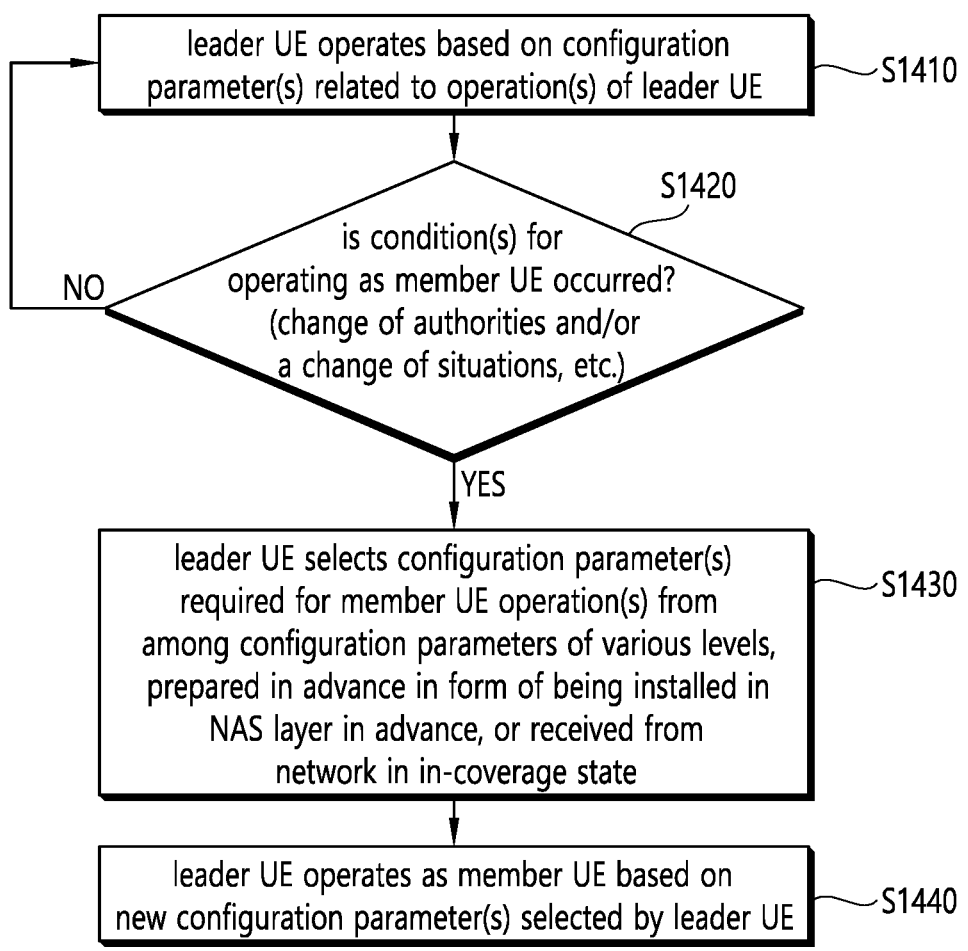
FIG. 14 shows a method in which a leader UE operates as a member UE autonomously, based on an embodiment of the present disclosure.

FIG. 14 shows a method in which a leader UE operates as a member UE autonomously, based on an embodiment of the present disclosure. The embodiment of FIG. 14 may be combined with various embodiments of the present disclosure.

Referring to FIG. 14, in step S1410, a leader UE may operate based on configuration parameter(s) related to operation(s) of the leader UE. For example, a network may configure the configuration parameter(s) in advance to UE(s) within a coverage of the network. For example, the network may transmit information related to the configuration parameter(s) to UE(s) within a coverage of the network.

In step S1420, the leader UE may determine whether or not condition(s) for operating as a member UE occurs. For example, if condition(s) such as a change of authorities and/or a change of situations occurs, the leader UE may determine that condition(s) for operating as the member UE occurs. For example, if the above condition(s) does not occur, the leader UE may perform the operation of step S1410. For example, if the above condition(s) occurs, the leader UE may perform the operation of step S1430.

In step S1430, the leader UE may select or determine configuration parameter(s) required for UE operation(s) in a changed state. For example, if the leader UE is located within the coverage of the network, the leader UE may receive configuration parameter(s) required for UE operation(s) in a changed state from the network. For example, if the leader UE is located outside the coverage of the network, the leader UE may select configuration parameter(s) required for UE operation(s) in a changed state, from among configuration parameters of various levels prepared in advance in a form of being installed in a NAS layer in advance.

In step S1440, the leader UE may operate as the member UE based on the new configuration parameter(s) selected by the leader UE.

Figure 15:
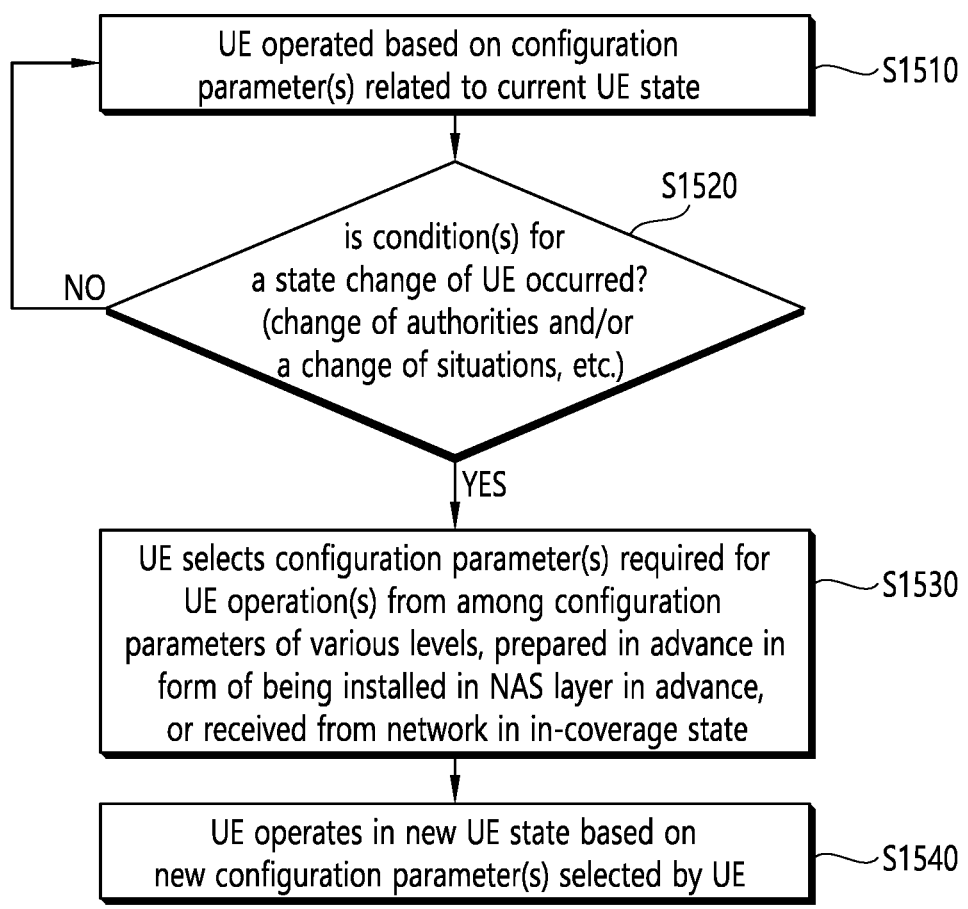
FIG. 15 shows a method in which a UE operates by changing a state autonomously, based on an embodiment of the present disclosure.

FIG. 15 shows a method in which a UE operates by changing a state autonomously, based on an embodiment of the present disclosure. The embodiment of FIG. 15 may be combined with various embodiments of the present disclosure.

Referring to FIG. 15, in step S1510, a UE may operate based on configuration parameter(s) related to a current UE state. For example, a network may configure the configuration parameter(s) in advance to UE(s) within a coverage of the network. For example, the network may transmit information related to the configuration parameter(s) to UE(s) within a coverage of the network.

In step S1520, the UE may determine whether or not condition(s) for a state change occurs. For example, if condition(s) such as a change of authorities and/or a change of situations occurs, the UE may determine that condition(s) to operate by changing its state occurs. For example, if the above condition(s) does not occur, the UE may perform the operation of step S1510. For example, if the above condition(s) occurs, the UE may perform the operation of step S1530.

In step S1530, the UE may select or determine configuration parameter(s) required for UE operation(s) in a changed state. For example, if the UE is located within the coverage of the network, the UE may receive configuration parameter(s) required for UE operation(s) in a changed state from the network. For example, if the UE is located outside the coverage of the network, the UE may select configuration parameter(s) required for UE operation(s) in a changed state, from among configuration parameters of various levels prepared in advance in a form of being installed in a NAS layer in advance.

In step S1540, the UE may operate in a new UE state based on the new configuration parameter(s) selected by the UE. For example, the UE may operate by changing the state based on the new configuration parameter(s).

Meanwhile, in SL-based communication for V2X service, a UE may configure or determine a priority of a message to be transmitted, based on QoS required for each service. For example, an application layer of a UE may configure or determine a priority of a message to be transmitted, based on QoS required for each service. In this case, QoS for each service may include priority, latency, reliability, and/or transmission distance, etc. In addition, the UE may transmit the message to satisfy QoS requirements of the message, by setting transmission parameters based on the priority configured to the message to be transmitted and a congestion level of transmission channel(s). For example, an access layer of the UE may transmit the message to satisfy QoS requirements of the message, by setting transmission parameters based on the priority configured to the message to be transmitted and a congestion level of transmission channel(s). Herein, the transmission parameters may include transmission power, the number of retransmissions, a size of resources to be used for transmission, modulation coding scheme (MCS) and/or a ratio of transmission channel(s) to be occupied by the UE for congestion control of transmission channel(s) (e.g., Channel occupancy Ratio (CR)), etc. For example, the UE may determine a congestion level of transmission channel(s) by calculating a ratio of a time interval in which the UEs use the channel during a specific time interval (e.g., channel busy ratio (CBR)).

For example, a groupcast application in which several UEs form a group to exchange message(s) between UEs in the group may include a leader UE which manages the entire groupcast operation and member UE(s) which performs communication under control of the leader UE. A representative embodiment may be a platooning application. For example, a platooning group leader may be responsible for forming, maintaining, and managing a platooning group. For example, at least one member of the platooning group may join or leave the platooning group with approval of the platooning group leader.

In this case, as described above, a priority of general communication message(s) is determined only by a service and QoS required for the service. However, in case of groupcast such as platooning, even for messages related to the same platooning service, it may be necessary for a leader UE to maintain and manage the entire groupcast even in a high channel congestion situation, by raising a priority of message(s) transmitted by the leader UE with different privileges and roles than a priority of message(s) transmitted by member UE(s). Otherwise, if messages transmitted by all UEs belonging to a group have the same priority, safety of the platooning group may be seriously threatened due to an increase in probability of communication failure due to channel congestion.

Based on various embodiments of the present disclosure, a method for increasing a priority of message(s) transmitted by a leader UE autonomously in groupcast communication and an apparatus supporting the same are proposed.

For example, UEs in a group may form a group by a groupcast application for a specific purpose. In addition, for example, all UEs in the group may be provided with the same service (e.g., platooning service). In this case, based on roles of a leader UE and member UE(s), UEs may select and use configuration parameter(s) and definition(s) related to a priority of message(s) required for UEs autonomously, from among configuration parameters of various levels including definition(s) related to a priority of transmission message(s) related service(s) pre-configured for UEs.

In this case, each of UEs in the group may transmit an identifier or information indicating/representing that each of UEs is a leader UE or a member UE, based on authorities and roles of each of UEs.

For example, from a viewpoint of an internal operation of a UE, the UE may select or determine a priority of message(s) to be transmitted, based on both QoS of a service and a role of the UE (e.g., a leader UE or a member UE). In addition, the UE may determine final transmission parameter(s) based on the priority of the selected message(s) and a congestion level (e.g., CBR) of transmission channel(s). For example, the transmission parameter(s) may include at least one of the following parameters.

maximum transmission power
the number of retransmissions
the number of resource blocks
Modulation and Coding Scheme (MCS)
maximum limit on channel occupancy ratio For each of the above-described transmission parameters or set of the above-described transmission parameters, several levels of specific parameter values and/or ranges may be configured/defined in advance based on QoS requirements. In addition, the above-described transmission parameters may be mapped to appropriate values based on a priority configured for each message and a congestion level (e.g., CBR) of transmission channel(s), in order to satisfy QoS of the service. To this end, the above-described transmission parameters may be defined in various levels of profiles in advance.

For example, pre-profiled mapping relationship may be re-configured based on pre-determined rule(s) in consideration of a priority for each service, CBR, and UE identifier (e.g., an identifier indicating whether a UE is a leader UE or a member UE). In this case, a method of re-configuring the mapping relationship may include a method in which a UE autonomously selects from among pre-configured profile information by considering all of the priority, the CBR, and the UE identifier. Alternatively, a method of re-configuring the mapping relationship may include a method in which a UE readjusts and uses an existing profile level based on pre-determined rule(s) according to a UE identifier, based on a pre-profile value previously defined based on the priority and the CBR. In this case, the UE may perform readjustment for each transmission parameter value and/or range. Alternatively, the UE may adjust the entire profile level.

Figure 16:
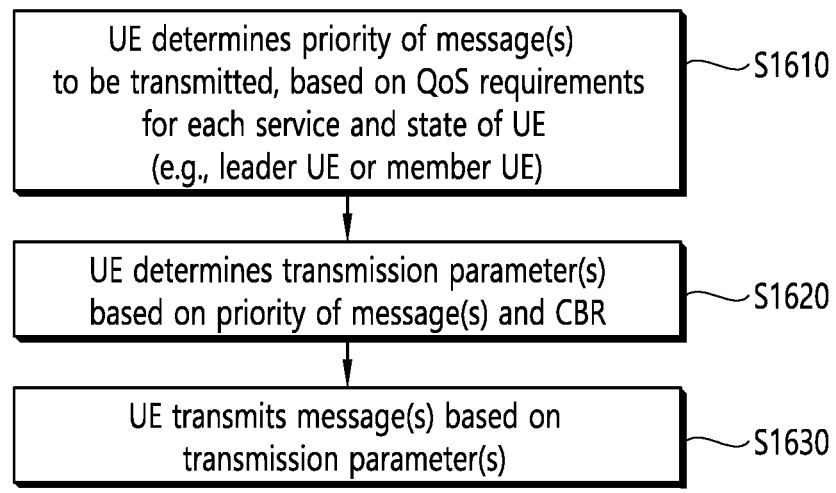
FIG. 16 shows a method for a UE to determine transmission parameter(s), based on an embodiment of the present disclosure.

FIG. 16 shows a method for a UE to determine transmission parameter(s), based on an embodiment of the present disclosure. The embodiment of FIG. 16 may be combined with various embodiments of the present disclosure.

Referring to FIG. 16, in step S1610, a UE may determine a priority of message(s) to be transmitted, based on QoS requirements for each service and a state of the UE (e.g., a leader UE or a member UE). In step S1620, the UE may determine transmission parameter(s) based on the priority of the message(s) and CBR. In step S1630, the UE may transmit the message(s) based on the transmission parameter(s).

For example, for congestion control of channel(s) in SL-based communication, a UE may detect whether or not other UE(s) uses transmission channel(s) during a specific time period (e.g., a sensing window). In addition, based on this, the UE may determine resource(s) related to available effective transmission channel(s). In addition, the UE may randomly perform SL transmission during a specific time period (e.g., a selection window) based on latency requirements. In this case, the UE may determine whether or not other UE(s) is using transmission channel(s) based on energy detection (e.g., RSSI) of received signal(s). For example, if an RSSI value measured on transmission channel(s) is higher than a specific threshold, the UE may determine that the transmission channel(s) is being used by other UE(s). Alternatively, the UE may determine whether or not other UE(s) is using transmission channel(s) based on energy detection (e.g., RSRP) of specific reference signal(s). For example, if an RSSP value measured on transmission channel(s) is higher than a specific threshold, the UE may determine that the transmission channel(s) is being used by other UE(s). In addition, in order to determine resource(s) to be actually used for transmission based on information related to detected effective transmission channel(s), the UE may determine a ratio of channel resource(s) to be actually used for transmission, based on the detected energy, among all transmission channel resources available for transmission.

For example, in a situation in which transmission channel(s) is congested, a UE may adjust parameter(s) related to sensing, and through this, QoS level(s) required according to a situation in which the UE operates and authorities/roles of the UE may be satisfied. For example, parameter(s) related to sensing may include at least one of a length of a sensing window, a detection threshold related to RSSI, a detection threshold related to RSRP, a ratio of channel resources used for actual transmission, and/or a length of a selection window. For example, in a situation in which transmission channel(s) is congested, a UE may adjust the above-described transmission parameter(s) and/or parameter(s) related to sensing, and through this, QoS level(s) required according to a situation in which the UE operates and authorities/roles of the UE may be satisfied. Therefore, from a viewpoint of internal operation(s) of the UE, the following embodiment of adjusting a priority of message(s) transmitted by a leader UE may be possible.

Length of sensing window: For example, in order to increase a priority of a leader UE, the leader UE may decrease a length of a sensing window. Accordingly, the leader UE can determine transmission channel resource(s) relatively less conservatively compared to member UE(s). For example, in order to increase a reliability of a leader UE, the leader UE may increase a length of a sensing window. Accordingly, the leader UE can determine transmission channel resource(s) relatively conservatively compared to member UE(s).

Accordingly, probability of transmission failure of message(s) transmitted by a leader UE may be reduced.

Energy detection threshold related to RSSI and RSSP: For example, the leader UE may increase an energy detection threshold. Accordingly, the leader UE can secure more available transmission channel resource(s) than member UE(s).

Length of selection window: For example, in order to reduce transmission delay of the leader UE, the leader UE may reduce a size of a selection window. Accordingly, the leader UE can secure a priority for channel access compared to member UE(s).

In terms of operation(s) between UEs, UEs in a group may obtain a UE identifier (e.g., an identifier indicating whether a UE is a leader UE or a member UE) after receiving signal(s) transmitted by other UE(s), respectively. In addition, UEs in the group may perform the following operations.

If a channel congestion level is low, each of UEs in the group may transmit message(s) based on a channel congestion level and a priority of message(s) configured according to QoS of service(s) regardless of a UE identifier, until the channel congestion level increases to an acceptable channel congestion level.

If a channel congestion level is high, each of UEs in the group may obtain UE identifier(s) included in received signal(s), until the channel congestion level is lower than an acceptable channel congestion level. In addition, each of UEs in the group may determine that there is message(s) transmitted by a leader UE based on a UE identifier, or each of UEs in the group may determine that there is message(s) to be transmitted by a leader UE within a pre-determined time period. In this case, member UE(s) may select or determine transmission parameter(s) based on a priority of message(a), a channel congestion level, and a UE identifier, as in the above-described method. In addition, member UE(s) may operate by relatively lowering its transmission priority.

Even if a channel congestion level is high, if transmission related to a leader UE is not detected or if transmission related to a leader UE is not predicted, member UE(s) may perform message transmission based on a channel congestion level and a priority configured by an application layer according to QoS of service(s).

For example, if a leader UE attempts to transmit message(s) with a high priority related to group maintenance/management, and if a congestion level of transmission channel(s) is high, the leader UE may perform the following operations.

If a delay requirement for message(s) to be transmitted by the leader UE is high, the leader UE may pre-empt message transmission of other UE(s), and the leader UE may preferentially transmit urgent message(s) of the leader UE with a higher delay requirement.

If a delay requirement for message(s) to be transmitted by the leader UE is not high, and if there is sufficient time for transmission, the leader UE may transmit information indicating/representing that there is message(s) to be transmitted by the leader UE, to UEs in the group through a UE identifier. Alternatively, the leader UE may transmit a signal such as a request-to-send (RTS) to other UE(s), and the leader UE may suspend or stop transmission of message(s), until a channel congestion is reduced below a certain level as other UE(s) recognizes the signal. For example, if a channel congestion level becomes lower than a certain level, the leader UE may perform transmission by securing transmission priority as described above.

Figure 17:
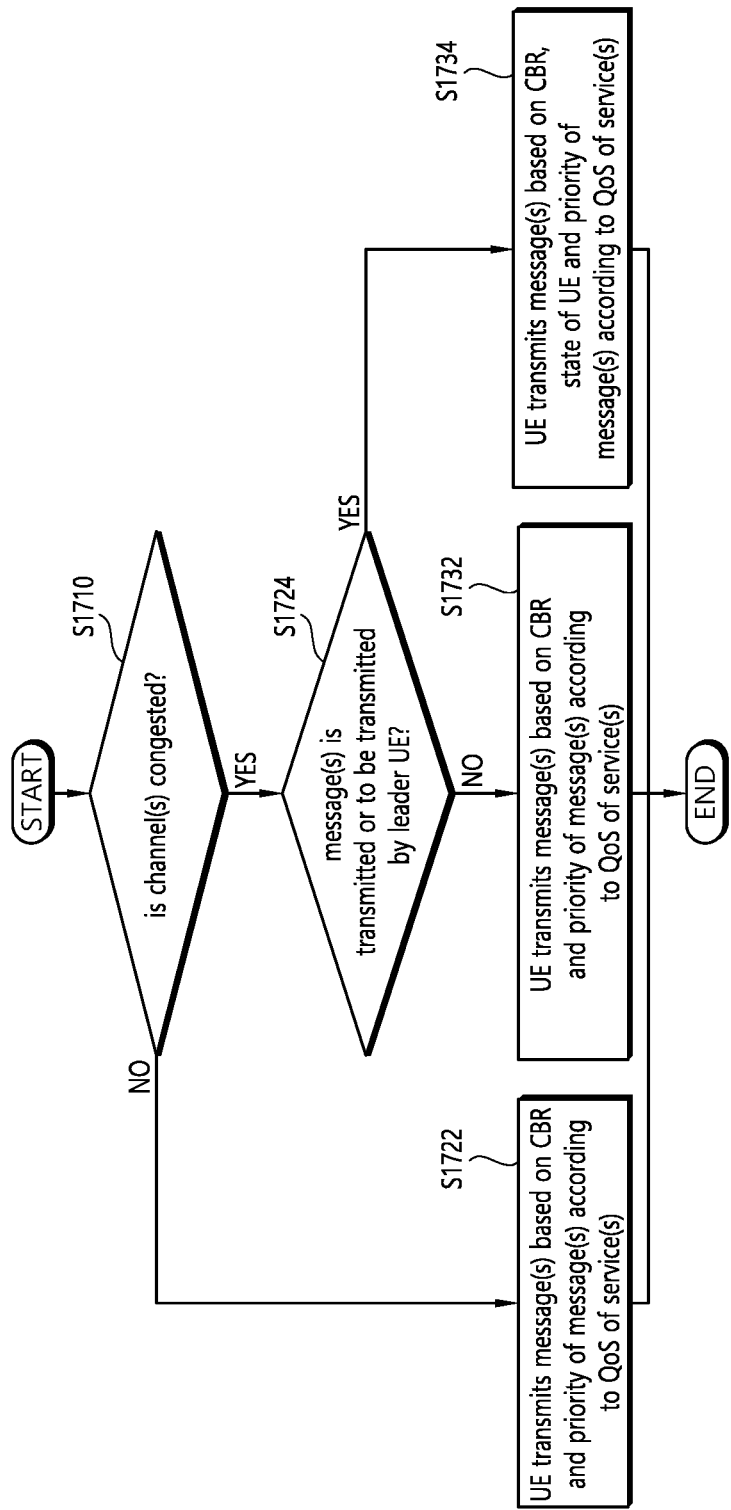
FIG. 17 shows a method for a UE to transmit message(s) based on a channel congestion situation, based on an embodiment of the present disclosure.

FIG. 17 shows a method for a UE to transmit message(s) based on a channel congestion situation, based on an embodiment of the present disclosure. The embodiment of FIG. 17 may be combined with various embodiments of the present disclosure.

Referring to FIG. 17, in step S1710, a UE may determine whether or not channel(s) is congested. For example, the UE may measure a channel state for a certain time period. In addition, if a value related to the channel state is greater than a threshold, the UE may determine that the channel(s) is congested. For example, the value related to the channel state may be RSSI or RSRP. For example, if the channel(s) is congested, the UE may operate based on step S1724. For example, if the channel(s) is not congested, the UE may operate based on step S1722.

In step S1722, the UE may transmit message(s) based on CBR and a priority of message(s) according to QoS of service(s).

Alternatively, in step S1724, the UE may determine whether or not a leader UE transmits message(s). Alternatively, the UE may determine whether or not a leader UE is scheduled to transmit message(s). For example, if the leader UE transmits message(s) or the leader UE is scheduled to transmit message(s), the UE may operate based on step S1734. For example, if the leader UE does not transmit message(s) or the leader UE is not scheduled to transmit message(s), the UE may operate based on step S1732.

In step S1732, the UE may transmit message(s) based on CBR and a priority of message(s) according to QoS of service(s).

In step S1734, the UE may transmit message(s) based on CBR, a state of the UE and a priority of message(s) according to QoS of service(s). For example, the state of the UE may be either a leader UE or a member UE.

The proposed method may be applied not only to a case in which a UE is in out-coverage, but also to a case in which a UE in in-coverage operates autonomously without connection with a network. In addition, the embodiment related to a method for adjusting a priority of message(s) by UE(s) may be used not only for a groupcast application in which a leader UE controls transmission operation(s) of member UE(s), but also for a unicast application, e.g., in which in-coverage UE(s) controls or assists operation(s) of out-coverage UE(s). The difference from an existing priority operation is that even for messages related to the same service, each of UEs adjusts a transmission priority of message(s) based on authorities and roles of each of UEs, and each of UEs transmits message(s). The proposed method may be applied to a UE in an RRC_IDLE state, a UE in an RRC_INACTIVE state, or a UE in an RRC_CONNECTED state.

Based on various embodiments of the present disclosure, in SL-based communication, in order to perform operations required for roles, authorities and operation situations of a UE, the UE may autonomously select and use configuration parameter(s) from among the pre-configured configuration parameter(s). Accordingly, a network connection load can be reduced. In addition, a UE may adaptively operate based on operating condition(s) even in an out-coverage situation.

Figure 18:
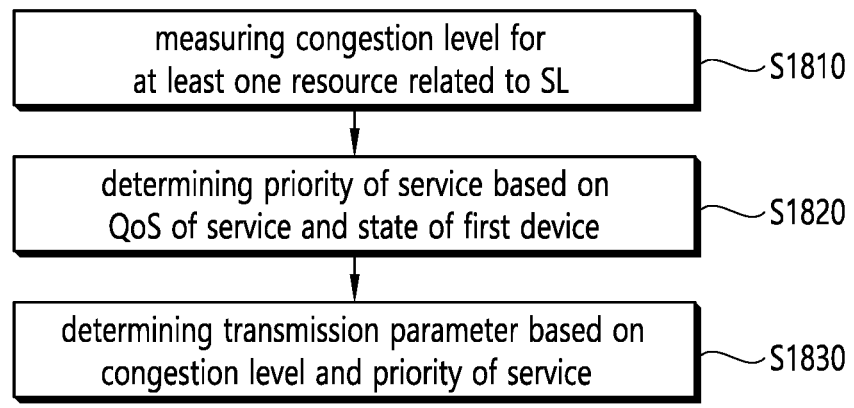
FIG. 18 shows a method for a first device to perform wireless communication, based on an embodiment of the present disclosure.

FIG. 18 shows a method for a first device to perform wireless communication, based on an embodiment of the present disclosure. The embodiment of FIG. 18 may be combined with various embodiments of the present disclosure.

Referring to FIG. 18, in step S1810, the first device may measure a congestion level for at least one resource related to a sidelink (SL).

In step S1820, the first device may determine a priority of a service based on quality of service (QoS) of the service and a state of the first device.

For example, the state of the first device may relate to at least one of an operation control authority or a transmission control authority for a neighbor device of the first device. For example, the state of the first device may be either a leader of a group or a member of a group. For example, the leader of the group may have at least one of an operation control authority and a transmission control authority for a neighbor device. For example, based on the state of the first device being a leader, the priority of the service may be determined to be higher than a priority related to QoS of the service.

In step S1830, the first device may determine a transmission parameter based on the congestion level and the priority of the service.

Additionally, for example, the first device may perform SL transmission based on the transmission parameter. For example, the transmission parameter may include at least one of a maximum transmission power, a number of retransmissions, a number of resource blocks, a modulation and coding scheme (MCS), or a maximum limit on channel occupancy ratio. For example, the congestion level may be channel busy ratio (CBR).

For example, the congestion level may be greater than a pre-configured threshold. Herein, the state of the first device may be a member of the group. In this case, additionally, the first device may detect SL transmission of a leader device in a group to which the first device belongs. For example, based on the congestion level being greater than the pre-configured threshold and the detecting SL transmission of the leader device, the priority of the service may be determined to be lower than a priority related to the QoS of the service.

For example, the congestion level may be greater than a pre-configured threshold. Herein, the state of the first device may be a leader of a group. In this case, additionally, the first device may adjust at least one of a threshold of a channel congestion level, a length of a sensing window, or a length of a selection window related to a sensing operation of the first device, based on the congestion level being greater than the pre-configured threshold. For example, the threshold of the channel congestion level may be a threshold used by the first device to determine at least one available resource. For example, the length of the selection window related to the sensing operation of the first device may be shorter than a length of a selection window related to a sensing operation of a member device in the group. For example, the threshold of the channel congestion level related to the sensing operation of the first device may be greater than a threshold of a channel congestion level of a member device in the group. For example, the length of the sensing window related to the sensing operation of the first device may be longer than a length of a sensing window related to a sensing operation of a member device in the group. For example, the length of the sensing window related to the sensing operation of the first device may be shorter than a length of a sensing window related to a sensing operation of a member device in the group.

The above-described embodiment may be applied to various devices to be described below. First, the processor (102) of the first device (100) may measure a congestion level for at least one resource related to a sidelink (SL). In addition, for example, the processor (102) of the first device (100) may determine a priority of a service based on quality of service (QoS) of the service and a state of the first device. In addition, for example, the processor (102) of the first device (100) may determine a transmission parameter based on the congestion level and the priority of the service.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: measure a congestion level for at least one resource related to a sidelink (SL); determine a priority of a service based on quality of service (QoS) of the service and a state of the first device; and determine a transmission parameter based on the congestion level and the priority of the service.

Based on an embodiment of the present disclosure, an apparatus configured to control a first user equipment (UE) may be provided. For example, the apparatus may comprise: one or more processors; and one or more memories being operably connected to the one or more processors and storing instructions. For example, the one or more processors may execute the instructions to: measure a congestion level for at least one resource related to a sidelink (SL); determine a priority of a service based on quality of service (QoS) of the service and a state of the first UE; and determine a transmission parameter based on the congestion level and the priority of the service.

Based on an embodiment of the present disclosure, a non-transitory computer-readable storage medium storing instructions may be provided. For example, the instructions, when executed, may cause a first device to: measure a congestion level for at least one resource related to a sidelink (SL); determine a priority of a service based on quality of service (QoS) of the service and a state of the first device; and determine a transmission parameter based on the congestion level and the priority of the service.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
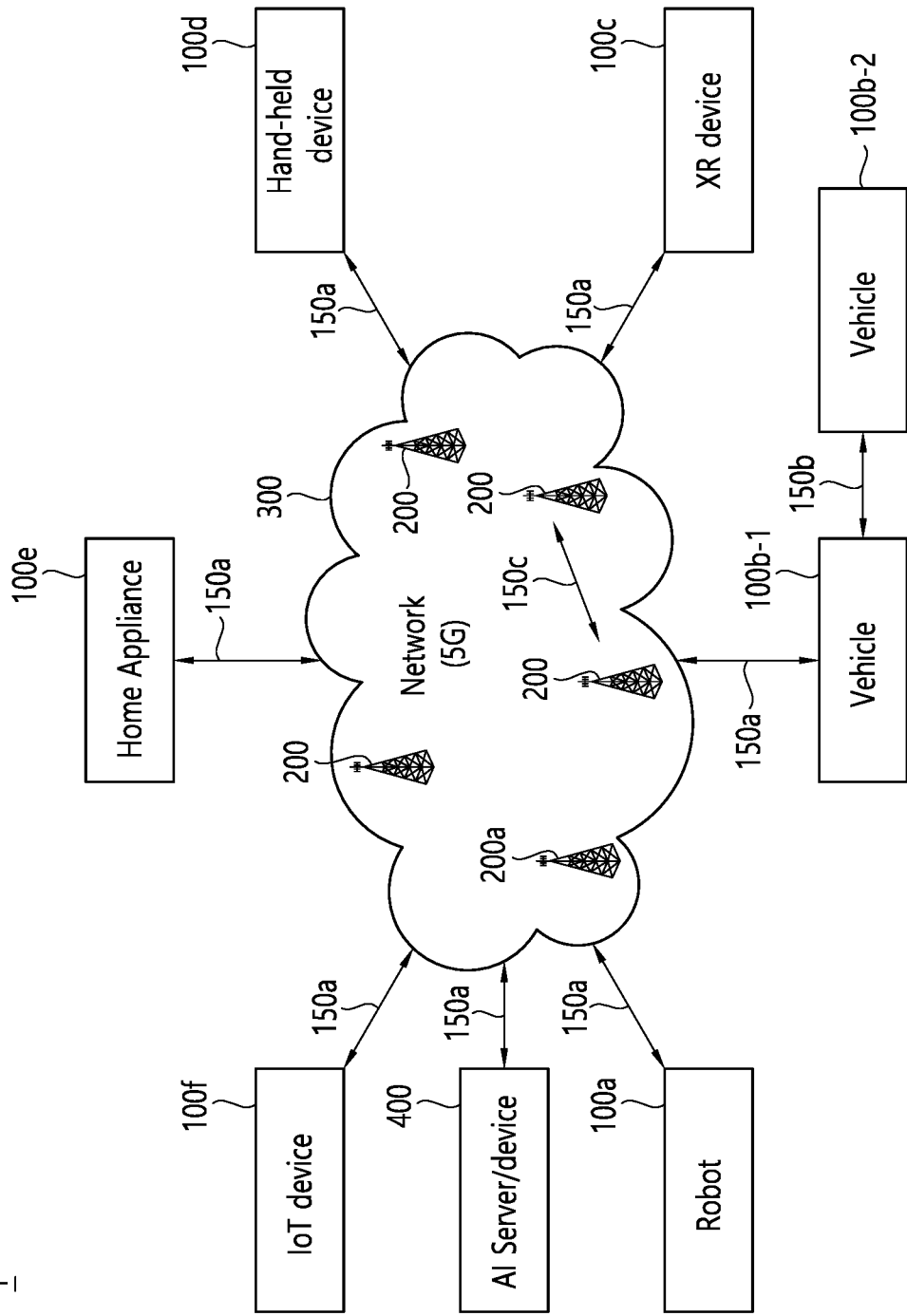
FIG. 19 shows a communication system 1, based on an embodiment of the present disclosure.

FIG. 19 shows a communication system 1, based on an embodiment of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
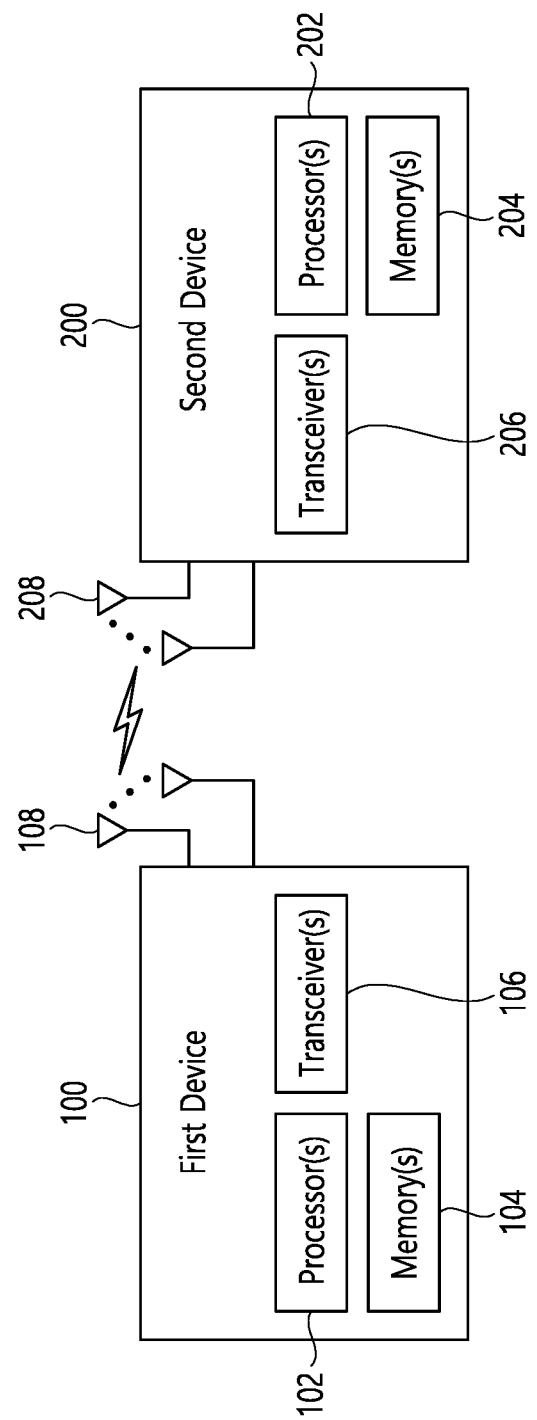
FIG. 20 shows wireless devices, based on an embodiment of the present disclosure.

FIG. 20 shows wireless devices, based on an embodiment of the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
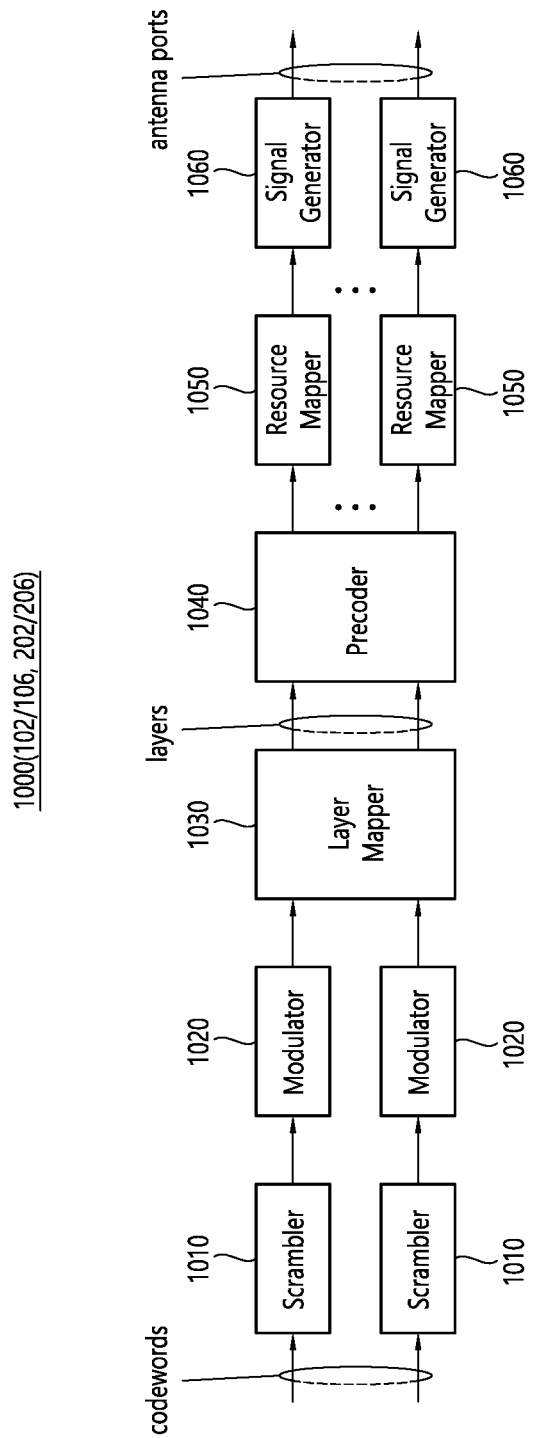
FIG. 21 shows a signal process circuit for a transmission signal, based on an embodiment of the present disclosure.

FIG. 21 shows a signal process circuit for a transmission signal, based on an embodiment of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 20. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20. Alternatively, the blocks 1010 to 1050 may be implemented by the processors 102 and 202 of FIG. 20 and the block 1060 may be implemented by the transceivers 106 and 206 of FIG. 20.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 22:
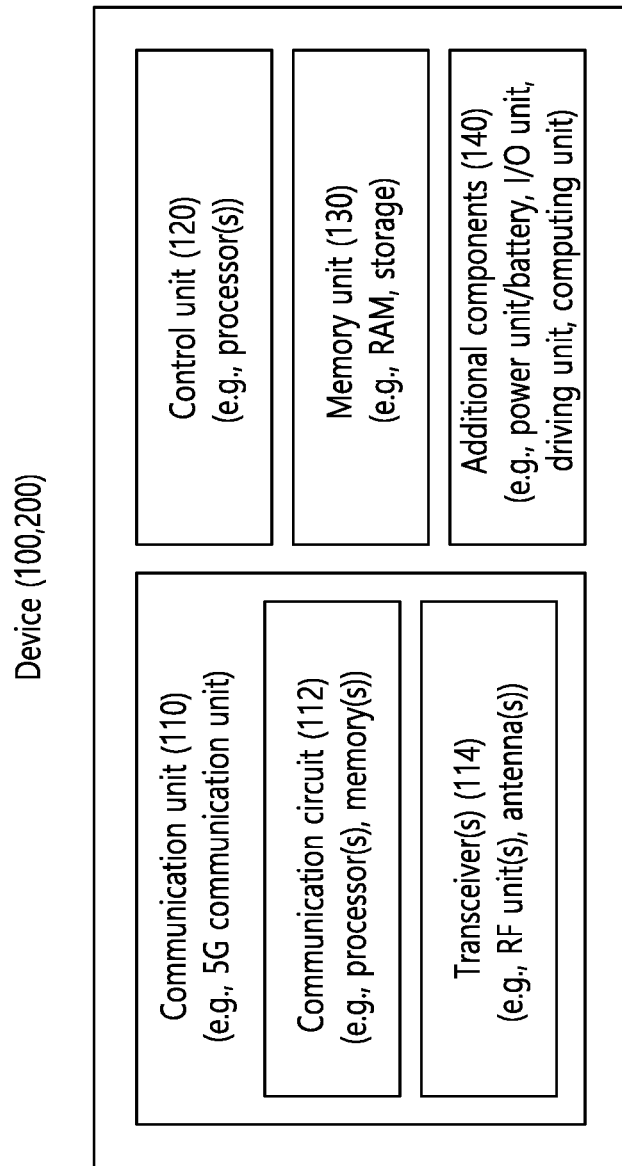
FIG. 22 shows another example of a wireless device, based on an embodiment of the present disclosure.

FIG. 22 shows another example of a wireless device, based on an embodiment of the present disclosure. The wireless device may be implemented in various forms according to a use-case/service (refer to FIG. 19).

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the B Ss (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
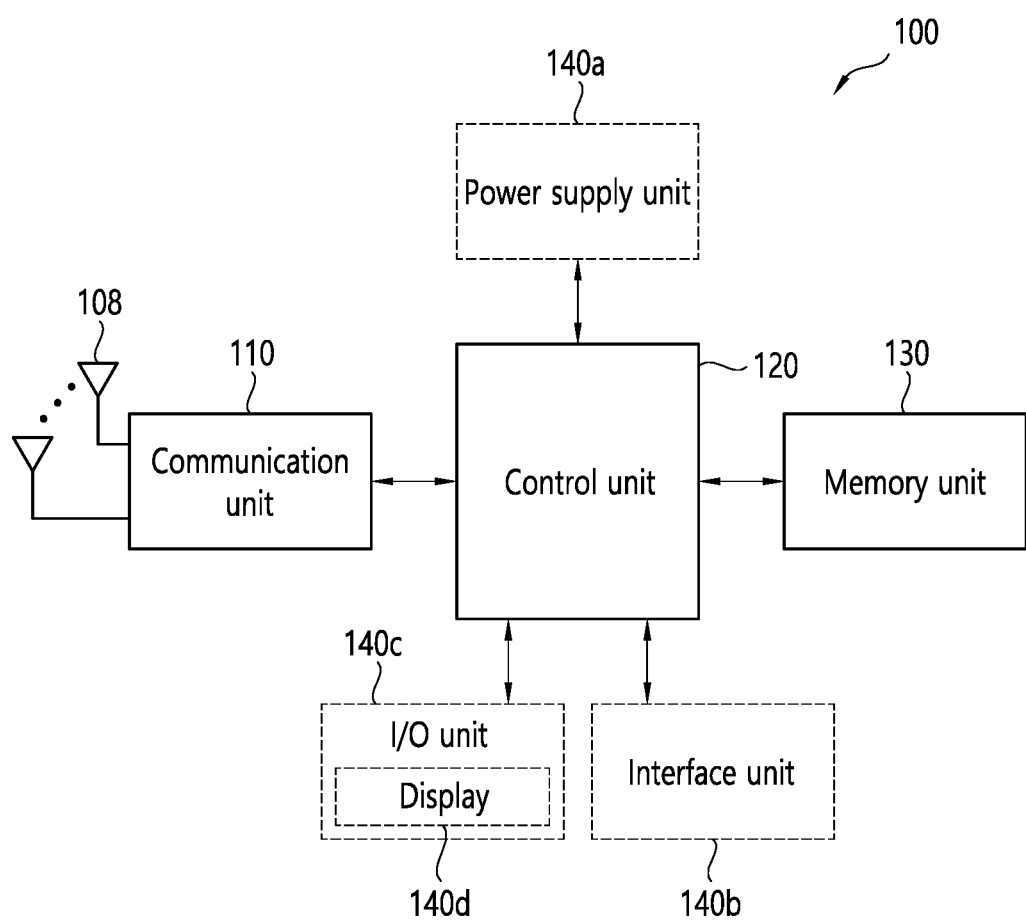
FIG. 23 shows a hand-held device, based on an embodiment of the present disclosure.

FIG. 23 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 24:
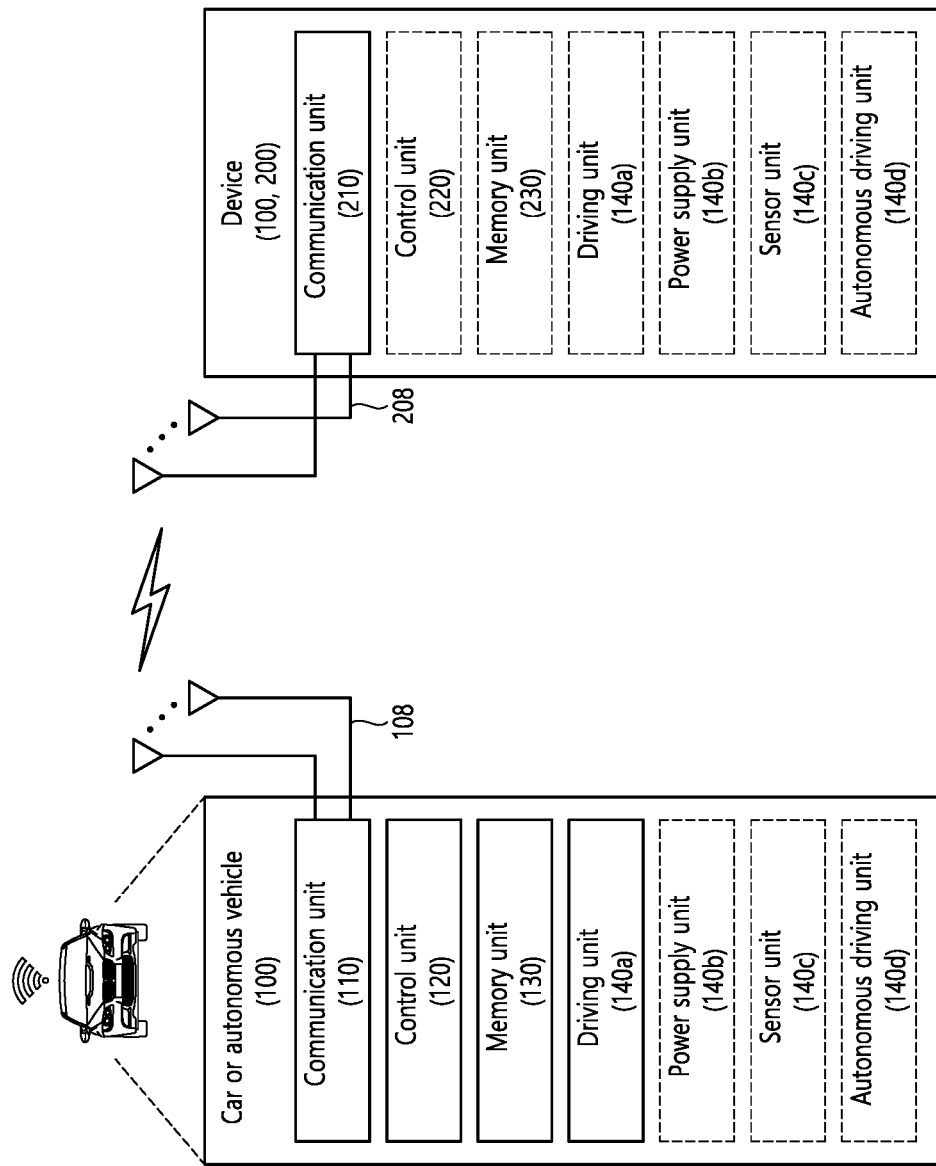
FIG. 24 shows a vehicle or an autonomous vehicle, based on an embodiment of the present disclosure.

FIG. 24 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 24, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a first device in a wireless communication system, the method comprising:
   measuring a congestion level for at least one resource related to a sidelink (SL);
   determining a priority of a service based on quality of service (QoS) of the service and a state of the first device,
   wherein, based on that the state of the first device is a leader of a group, the priority of the service is determined to be higher than a priority related to the QoS of the service;
   determining a transmission parameter based on the congestion level and the priority of the service;
   transmitting, to a second device, sidelink control information (SCI) for scheduling of a physical sidelink shared channel (PSSCH) on a physical sidelink control channel (PSCCH); and
   transmitting, to the second device, the service on the PSSCH.

2. The method of claim 1, wherein the state of the first device is related to at least one of an operation control authority or a transmission control authority for a neighbor device of the first device.

3. The method of claim 1, wherein the leader of the group has at least one of an operation control authority or a transmission control authority for a neighbor device.

4. The method of claim 1, wherein a SL transmission is performed based on the transmission parameter.

5. The method of claim 1, wherein the transmission parameter includes at least one of a maximum transmission power, a number of retransmissions, a number of resource blocks, a modulation and coding scheme (MCS), or a maximum limit on a channel occupancy ratio.

6. The method of claim 1, wherein the congestion level is a channel busy ratio (CBR).

7. The method of claim 1, wherein the congestion level is greater than a pre-configured threshold.

8. The method of claim 7,
wherein, based on the state of the first device is a member of the group, a SL transmission of a leader device in the group to which the first device belongs is detected by the first device.

9. The method of claim 8, wherein, based on the congestion level being greater than the pre-configured threshold and the detected SL transmission of the leader device, the priority of the service is determined to be lower than the priority related to the QoS of the service.

10. The method of claim 7,
wherein at least one of a threshold of a channel congestion level, a length of a sensing window related to a sensing operation of the first device, or a length of a selection window related to a sensing operation of the first device is adjusted based on the congestion level being greater than the pre-configured threshold.

11. The method of claim 10, wherein the threshold of the channel congestion level is a threshold used by the first device to determine at least one available resource.

12. The method of claim 10, wherein the length of the selection window related to the sensing operation of the first device is shorter than a length of a selection window related to a sensing operation of a member device in the group.

13. The method of claim 10, wherein the threshold of the channel congestion level is greater than a threshold of a channel congestion level of a member device in the group.

14. The method of claim 10, wherein the length of the sensing window related to the sensing operation of the first device is longer than a length of a sensing window related to a sensing operation of a member device in the group.

15. The method of claim 10, wherein the length of the sensing window related to the sensing operation of the first device is shorter than a length of a sensing window related to a sensing operation of a member device in the group.

16. A first device adapted to perform wireless communication, the first device comprising:
at least one transceiver;
at least one processor; and
at least one memory connected to the at least one processor and storing instructions that, based on being executed, cause the first device to perform operations comprising:
measuring a congestion level for at least one resource related to a sidelink (SL);
determining a priority of a service based on quality of service (QoS) of the service and a state of the first device, wherein, based on that the state of the first device is a leader of a group, the priority of the service is determined to be higher than a priority related to the QoS of the service;
determining a transmission parameter based on the congestion level and the priority of the service;
transmitting, to a second device, sidelink control information (SCI) for scheduling of a physical sidelink shared channel (PSSCH) on a physical sidelink control channel (PSCCH); and
transmitting, to the second device, the service on the PSSCH.

17. A processing device adapted to control a first device, the processing device comprising:
at least one processor; and
at least one memory connected to the at least one processor and storing instructions that, based on being executed, cause the first device to perform operations comprising:
measuring a congestion level for at least one resource related to a sidelink (SL);
determining a priority of a service based on quality of service (QoS) of the service and a state of the first device, wherein, based on that the state of the first device is a leader of a group, the priority of the service is determined to be higher than a priority related to the QoS of the service;
determining a transmission parameter based on the congestion level and the priority of the service;
transmitting, to a second device, sidelink control information (SCI) for scheduling of a physical sidelink shared channel (PSSCH) on a physical sidelink control channel (PSCCH); and
transmitting, to the second device, the service on the PSSCH.

* * * * *